UNITED STATES PATENT OFFICE.

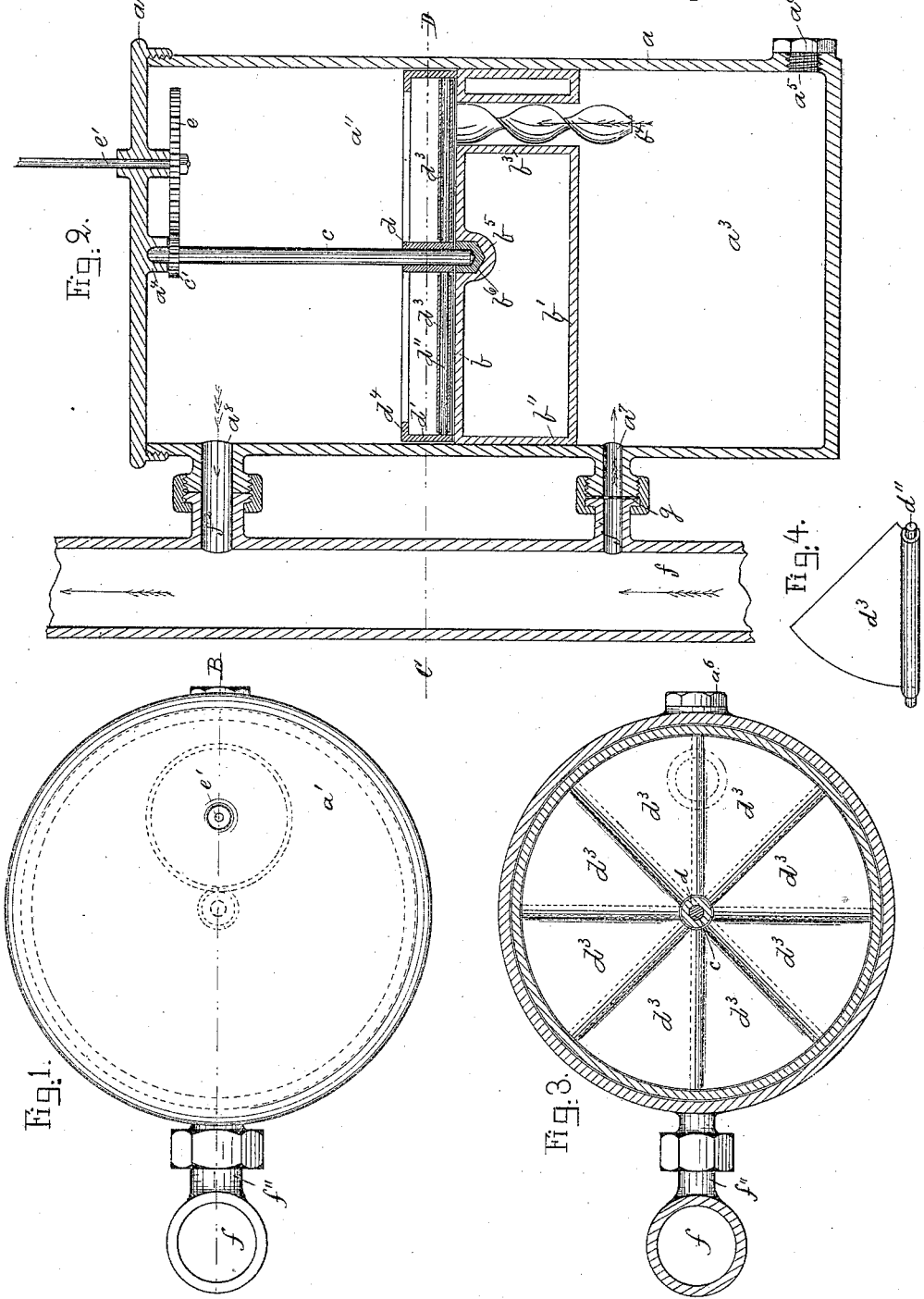

SUMNER SHAW, OF BOSTON, MASSACHUSETTS.

ROTARY METER.

SPECIFICATION forming part of Letters Patent No. 305,763, dated September 30, 1884.

Application filed February 20, 1884. (No model.)

*To all whom it may concern:*

Be it known that I, SUMNER SHAW, a citizen of the United States, residing at Boston, in the county of Suffolk and State of Massachusetts, have invented certain new and useful Improvements in Water-Meters; and I do hereby declare that the same are fully described in the following specification and illustrated in the accompanying drawings.

This invention relates to improvements in water-meters, and it is carried out as follows, reference being had to the accompanying drawings where—

Figure 1 represents a plan view of the invention. Fig. 2 represents a central longitudinal section on the line A B shown in Fig. 1. Fig. 3 represents a cross-section on the line C D shown in Fig. 2; and Fig. 4 represents a detail view of one of the hinged wings on the rotary meter-wheel, as will hereinafter be more fully shown and described.

Similar letters refer to similar parts wherever they occur on the different parts of the drawings.

$a$ is the shell or case, closed at the bottom, as shown in Fig. 2, and having a cover, $a'$, screwed onto its upper end or otherwise secured thereto perfectly water-tight, in a suitable or equivalent manner. Within the shell $a$, about midway from its top and bottom or at any other suitable distance from the upper end of said shell, I locate a diaphragm or horizontal division-wall, $b$, and at a little distance below it a similar horizontal division-wall, $b'$, as shown in Fig. 2; and in practice I prefer to cast the said walls in one piece with the cylinder $b''$ that is soldered to or otherwise secured perfectly water-tight to the interior of shell $a$, as shown in Fig. 2. By means of said walls $b\ b'$, the shell $a$ is divided in an upper compartment, $a''$, which I term the "meter-chamber," and a lower compartment, $a^3$, which I term the "receiving-chamber." The two walls $b$ and $b'$ are united by means of the hollow pipe or cylinder $b^3$, through which the water is forced from the receiving-chamber $a^3$ into the meter-chamber $a''$, and said hollow pipe or cylinder $b^3$ is located at a suitable distance from the center of the division-walls $b\ b'$, so as to properly conduct the water to the rotary meter-wheel, hereinafter to be described. Within the hollow pipe $b^3$ I arrange a spiral conductor, $b^4$, that is secured in a suitable manner to the interior of the pipe $b^3$, as shown in Fig. 2, and in practice I prefer to extend said spiral conductor $b^4$ somewhat below the lower division-wall, $b'$, as shown in said Fig. 2. The said spiral conductor $b^4$ serves for the purpose of concentrating the force of the water pressed upward from receiving-chamber $a''$, and to direct and guide the stream of water in a steady flow against the meter-wheel when water is being drawn. A central recess, $b^5$, is made in the division-wall $b$, in which I prefer to secure the step or bearing $b^6$, made of glass or other suitable hard and anti-frictional material, in which the lower end of the meter-wheel spindle $c$ is supported. $a^4$ is a suitable socket or recess on the under side of cover $a'$, and it serves as a bearing for the upper end of the said spindle $c$, as shown in Fig. 2. To the spindle $c$, in close proximity to the division-wall $b$, is secured the rotary meter-wheel, and this is composed of a hub, $d$, secured to spindle $c$, and an annular ring, $d'$, secured to hub $d$ by means of radial rods or wires $d''\ d''$, to which are hinged the respective wings $d^3\ d^3$, as shown in Figs. 3 and 4. The radial arms or wires $d''$, with their hinged wings $d^3$, are located as close to the upper side of wall $b$ as is consistent with the free motion of the said meter-wheel. Each wing $d^3$ is preferably made wide enough to slightly overlap the next one, although any other equivalent means may be employed to serve as a lower stop or rest for the said hinged wings $d^3$. I prefer to provide the ring $d'$ in its upper end with an inwardly-projecting annular stop-flange, $d^4$, as shown in Fig. 4, or with similar projections, to limit the swinging motion of the wings $d^3$ in their upward motions when acted on by the force of the water through cylinder $b^3$.

To the upper end of spindle $c$ is secured a small pinion, $c'$, that engages with a spur-gear, $e$, attached to spindle $e'$, that passes through a suitable bearing in cover $a'$, and is connected by means of worms or gears or other equivalent or well-known intermediate connecting mechanism to the indexes, by means of which the consumption of the water is ascertained and registered. Through the lower end of shell $a$ is made a perforation, $a^5$, that is normally closed by means of a screw-plug, $a^6$, or equivalent device, and when the latter is removed the perforation $a^5$ serves for the purpose of allowing the grit and sediment that accumulates in the receiving-chamber $a^3$ to be washed out and to escape as may be required from time to time.

$f$ represents the water-supply pipe, and in practice I prefer to provide it with branches $f'$ and $f^2$ communicating, respectively, with branches $a^7$ and $a^8$ leading to receiving-chamber $a^3$ and from meter-chamber $a''$, as shown in Fig. 2.

$f^3$ and $f^4$ are suitable screw-couplings on the respective branches $f'$ and $f''$ to effect water-tight joints at said parts.

$g$ is a strainer attached to the end of branch $a^7$ to prevent, as near as is possible, grit and sediments, &c., from entering the chamber $a^3$.

I do not wish to confine myself to the exact arrangement of having supply-pipe $f$ on one side of the shell $a$, as I may, if so desired, connect the said supply-pipe directly to chamber $a^3$ and attach an independent delivery-pipe to the meter-chamber $a''$, if required.

The operation of the invention is as follows: As the water is being drawn through and from supply-pipe $f$, a portion of it enters through openings $f'$ $a^7$, leading to receiving-chamber $a^3$, from which it is conducted in a concentrated and even flow through pipe $b^3$ and its internal spiral guide, $b^4$, against the under side of the meter-wheel, causing its wings $d^3$, one after another, to rise to allow the water to enter the meter-chamber $a''$, and in so doing causing the said meter-wheel to revolve in a corresponding proportion to the amount of water that is being drawn and the pressure of the liquid. As the meter-wheel continues to rotate, and the meter-chamber $a''$ being filled, the water is forced out through the openings $a^8$ $f''$, leading to the upper end of supply-pipe $f$, thus keeping the meter-wheel in a rotary motion as long as the liquid is being drawn, and in a corresponding proportion to the quantity that is being used. By the train of gears $c'$ $e$ and spindle $e'$ connected to a suitable index, the proper amount of water used may be read off and ascertained at a glance.

The apparatus is very simple, strong, and durable, and not liable to get out of order.

Having thus fully described the nature, construction, and operation of my invention, I wish to secure by Letters Patent and claim—

1. In a water-meter, the shell or case $a$, having receiving-chamber $a^3$, hollow cylinder $b^3$, and spiral guide $b^4$, combined with the meter-wheel, as described, having hinged wings $d^3$ $d^3$, and adapted to rotate upon the spindle $c$ within the meter-chamber $a''$, substantially as set forth.

2. In a water-meter, the rotary meter-wheel composed of hub $d$, annular ring $d'$, radial arms $d''$ $d''$, and hinged wings $d^3$ $d^3$, substantially as described.

3. In combination with the shell $a$, pipe $b^3$, spiral guide $b^4$, and the rotary meter-wheel $d$ $d'$ $d''$ $d^3$ $d^4$, as described, the branches $a^7$ $a^8$, leading to supply-pipe $f$, substantially as set forth, and for the purpose specified.

4. In a water-meter, the shell $a$ and internal division-walls, $b$ $b'$, combined with hollow pipe $b^3$ and its internal spiral guide, $b^4$, for the purpose of concentrating and directing the force of the water properly to the rotary meter-wheel, substantially as described.

In testimony whereof I have affixed my signature in the presence of two witnesses.

SUMNER SHAW.

Witnesses:
ALBAN ANDRÉN,
HENRY CHADBOURN.